Feb. 6, 1940.   J. P. MINTON   2,189,741
SEISMOGRAPH BLASTING CAP
Filed Nov. 17, 1937   2 Sheets-Sheet 1

Inventor
John P. Minton
By Dallas R. Lamont
Attorney

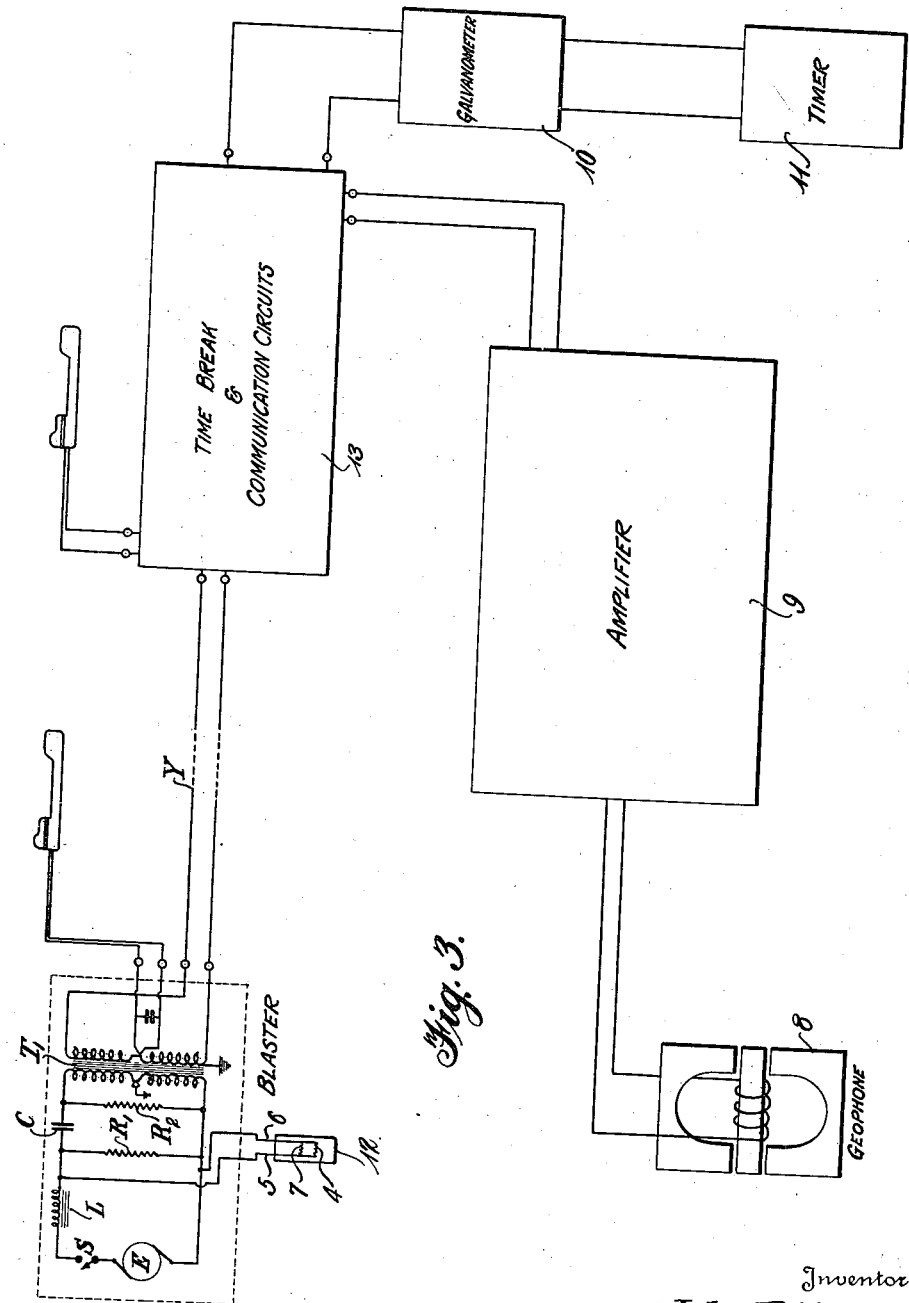

Patented Feb. 6, 1940

2,189,741

UNITED STATES PATENT OFFICE 2,189,741

SEISMOGRAPH BLASTING CAP

John P. Minton, Dallas, Tex., assignor, by mesne assignments, to Socony-Vacuum Oil Company, Incorporated, New York, N. Y., a corporation of New York Application November 17, 1937, Serial No. 174,970

2 Claims. (Cl. 181—0.5)

This invention relates generally to electric blasting caps and more particularly to that type of blasting cap that is employed in seismographic prospecting.

In seismographic prospecting artificial seismic waves are generated in the earth's surface by detonating a charge of explosive, at or near, the surface. By recording and observing the characteristics of the seismic waves thus generated, it is possible to ascertain physical characteristics of the subsurface strata through which these waves have passed, or from which these waves have been reflected. The velocity at which the wave travels through the earth's surface is a primary factor in ascertaining the physical properties of the subsurface strata mentioned above. To accurately measure these velocities it becomes of prime importance to know definitely at what instant the explosive, which generates the seismic waves, is detonated.

In the past it has been customary, for the most part, to record the electrical impulses caused by the fusing of the detonating cap's fuse. It has been assumed, for purpose of computation, that this instant corresponds to the instant of detonation of the dynamite. Due, however, to possible cap-lag and other extraneous conditions, these two instants do not necessarily agree in time. Accordingly, numerous methods have been proposed to circumvent this difficulty and to secure a time-break due to the detonation of the dynamite only, and not at all caused by the burning of the fuse in the cap. Cap manufacturers have carried out a great deal of research and development to avoid the possibility of errors entering into seismic computations caused by cap-lag and other varying factors. At the same time geophysical companies have given much thought to this particular difficulty.

For example, numerous methods and circuits have been designed for the purpose of recording a signal when the charge of explosive is detonated. The most common of these involves the use of a blasting cap having three leads or conductors attached thereto, two of which are used for the purpose of detonating the cap, while the third, when ruptured by the bursting of the cap, is used to give a signal to indicate the instant of detonation. A second method that has been extensively used heretofore consists in the use of separate conductors which form a closed signal circuit. A portion of these conductors is wrapped around either the cap or the charge of explosive in such a manner that when detonation takes place, the conductor will be blown apart, thereby opening the signal circuit. The current dying out of this signal circuit is in the form of a surge which can be recorded to indicate the time of detonation.

Methods such as those described above are open to objection. In the first case three leads are utilized. This is likely to be confusing to the operator in properly connecting the cap to its circuits. Also, the expense of a third conductor is a consideration. The latter method described above of necessity requires four conductors leading from the charge of explosives, two of them being the detonation circuit for the cap and the other two being the signal circuit. Additionally the use of this method requires that currents of substantial magnitude, flowing in the signal circuit, be carried in proximity to the cap or explosive material, which under certain conditions may prove hazardous.

Charges of explosives that are used to generate artificial seismic waves in seismographic work are for the greater part placed in holes, ranging in depth from 50 to 100 feet. In most areas where seismographic prospecting is being carried on, it is necessary to case these shot holes before the charge can be forced to the depth required. The edges of the casing at the assembly joints are usually quite rough and there is ever present the danger of scraping the insulation from the conductors leading from the cap, or even in some cases of entirely severing or breaking the conductor. For this reason, it is always desirable to use as few conductors, attached to the charge, as possible. A further important objection to certain types of blasting caps and means for recording the time of detonation, which have been commonly used, is the lack of exact coincidence between the actual detonation and the signal which is intended to mark the time of detonation on the seismogram.

The principal object of this invention is to overcome the objectionable features of prior methods outlined above. This is accomplished, according to this invention, by providing an electric blasting cap for use in seismographic prospecting having dual bridges. For the purpose of eliminating the time lag referred to above, a second bridge wire of relatively higher resistance than that of the normal bridge wire is employed. The second bridge wire is such that it will not fuse from the output of the blasting generator used. Using a second bridge in this manner causes the electric blasting circuit to remain undisturbed until the detonation of the blasting cap actually is effected, and there can be no time interval between the instant of detonation of the cap and the instant at which the signal introduced in the circuit because the second bridge wire is blown apart by the detonation. The result, therefore, is to eliminate the error commonly known as cap-lag encountered when using the standard caps of only one bridge wire, and to eliminate any unusual error due to manufacturing variations amongst the caps.

Other objects and advantages of this invention will be apparent from the following detailed description when considered with the accompanying drawings in which:

Figure 3 is a circuit diagram partly illustrated schematically showing the relation between the electric blasting cap and the electric seismograph with which such a cap is to be used.

Figure 1:
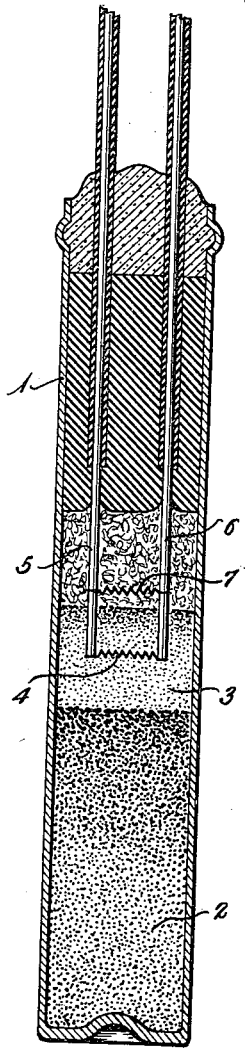
Figure 1 is a longitudinal section of an electric blasting cap that is illustrative of this invention.
Figure 2:
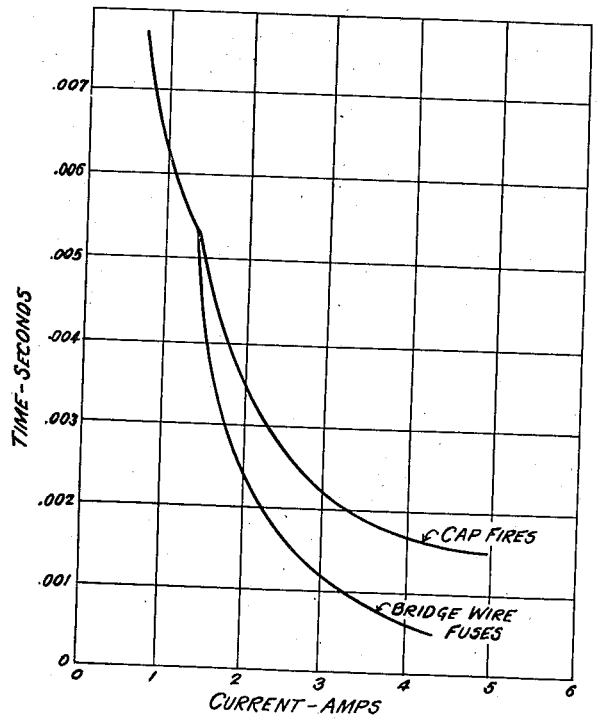
Figure 2 is a curve which has been plotted with current as abscissa and time as ordinates.

Referring to the drawings in detail, in Figure 1 the shell 1, which may be of copper-zinc alloy or any other suitable material, is usually first loaded with a base charge 2. Then a primer charge 3 is next placed on top of the base charge. The conventional bridge wire, as illustrated at 4, having the proper characteristics such that it will fuse to ignite the primer charge, is usually connected across the ends of the conductors 5 and 6, and is embedded in the primer charge. The detailed description thus far is that of a conventional electric blasting cap, and is all that is necessary to detonate a charge of explosive, but it will be noted that there are no provisions made whereby the instant of detonation can be detected or recorded. The actual time of detonation of the cap in many instances, as shown by Figure 2, is not always the same as the instant at which the fusing of the bridge wire 4 takes place. In many instances where the detonating current flowing through the fusible bridge 4 of the cap is caused to build up relatively quickly, an appreciable time elapses between the instant at which the bridge wire fuses and that at which the cap actually detonates. Therefore, it becomes apparent that if, as is common practice, the time at which the bridge wire fuses and opens the cap circuit is used as a signal to indicate on the seismogram the instant at which detonation takes place, an error occurs, in some unusual instances as much as from .01 to .02 of a second. An error of this magnitude in seismographic work creates a substantial error in depth computations, thereby reducing the accuracy of the work. This difficulty is overcome according to the present invention by placing a second bridge 7, of higher resistance than bridge 4, across the conductors 5 and 6 as shown. This bridge wire 7 will not be ruptured to open the cap circuit until actual detonation of the cap occurs. The size and resistance of this second bridge 7 is selected so that the greater portion of the current will flow through the bridge 4 imbedded in the primer charge and fuse it. The position of the second bridge 7 relative to the first bridge 4 is not critical so long as it is placed at a point where there will be no doubt of its being ruptured by the detonation of the cap. The use of the second bridge effectively prevents the electric circuit through the cap from being broken until the cap actually detonates and blows the bridge apart. The opening of the cap circuit by breaking this second bridge causes the current to die out of the circuit abruptly in the form of a surge, and this surge or impulse can be utilized as a signal to indicate the exact instant at which detonation occurred.

Although the above described electric blasting cap of this invention can be employed to produce a signal of the time of detonation of the charge of explosive in a number of different electric seismograph circuits, there is shown in Figure 3 an electric seismograph circuit in which it has been used successfully. In Figure 3 there is illustrated the conventional geophone 8 connected to the input of an amplifier 9, the amplifier 9 in turn having its output terminals connected to a conventional recording galvanometer 10. In order to illustrate a complete and operable electric seismograph, there is indicated at 11 a timer or means for generating a signal of definite frequency which can be recorded on the galvanometer 10 to indicate elapsed time during the recording period. There is also connected to the galvanometer 10 an electric blasting and signal communicating circuit. In this circuit there is illustrated an electric blasting cap 12 having dual bridges 4 and 7, the bridge wire shown at 4 being the one which actually fuses to detonate the electric blasting cap while that shown at 7 remains intact to complete the blasting circuit until the detonation of the blasting cap ruptures it. When the bridge 7 is ruptured by the detonation of the electric blasting cap, a signal in the form of a transient voltage is thereby generated in the blasting circuit and is communicated through the transformer T₁, the conductors Y, to the time break and communication circuits 13, in the recording truck and finally to the recording galvanometer 10. This signal when recorded on a seismogram will mark the exact instant of detonation of the explosive. Thus it can be seen that the possibility of errors entering into the overall time between the instant of detonation and the actual recording of seismic waves is positively eliminated.

I claim:

1. In an apparatus for seismic survey, including a blasting circuit, a source of power for energizing the circuit, a recorder for recording seismic waves and a communication circuit connecting the blasting circuit with the recorder, an improved blasting structure comprising a detonating substance, a plurality of conductors extending into said structure, fusible means lying in contact with the detonating substance and connected to the conductors, frangible electrical conducting means disposed within the structure and connected to the conductors to normally maintain the blasting circuit closed, independent of the fusible means, said frangible means being so positioned with respect to the detonating substance that it will be ruptured coincident with the detonation of the substance to generate a transient voltage that will be communicated to the recorder as an indication of the exact instant of detonation of the explosive charge.

2. In an apparatus for seismic survey, including a blasting circuit, a source of power for energizing the circuit, a recorder for recording seismic waves and a communication circuit connecting the blasting circuit with the recorder, an improved electric blasting cap for the detonation of explosives to generate seismic waves comprising a shell, a detonating substance within the shell, a pair of conductors extending from the blasting circuit to a point within the shell, fusible means connected to the conductors and lying in contact with the detonating substance within the shell, for igniting the detonating substance, frangible conducting means connected to the conductors but disposed within the shell adjacent the fusible means and detonating substance in such a manner that the frangible means will be ruptured on detonation of the detonating substance to generate an electrical signal in the blaster circuit that will be communicated to the recorder as the indication of the instant of detonation of the electric blasting cap.

JOHN P. MINTON.